US 11,349,794 B2

(12) United States Patent
Leveille et al.

(10) Patent No.: US 11,349,794 B2
(45) Date of Patent: May 31, 2022

(54) SCANNING TOOL FOR DETECTING SENSITIVE INFORMATION IN TEXT TRANSMISSIONS (71) Applicant: The United States of America, as represented by the Secretary of the Navy, Crane, IN (US)

(72) Inventors: Jamie Blaine Leveille, Kennebunk, ME (US); Thomas James Tabb, Portsmouth, NH (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 17/063,202

(22) Filed: Oct. 5, 2020

(65) Prior Publication Data
US 2021/0243146 A1 Aug. 5, 2021

Related U.S. Application Data (60) Provisional application No. 62/909,916, filed on Oct. 3, 2019.

(51) Int. Cl.
*G06F 16/383* (2019.01)
*H04L 51/00* (2022.01)
*G06F 3/04842* (2022.01)
*H04L 51/42* (2022.01)

(52) U.S. Cl.
CPC .......... *H04L 51/12* (2013.01); *G06F 3/04842* (2013.01); *G06F 16/383* (2019.01); *H04L 51/22* (2013.01)

(58) Field of Classification Search
CPC ... G06F 3/04842; G06F 16/383; H04L 51/12; H04L 51/22
See application file for complete search history.

(56) References Cited

U.S. PATENT DOCUMENTS

| 8,756,289 B1* | 6/2014 | Appenzeller | G06Q 10/107 709/206 |
| 2014/0149516 A1* | 5/2014 | Paulraj | H04L 51/08 709/206 |
| 2016/0308814 A1* | 10/2016 | Meister | H04L 51/14 |

* cited by examiner

Primary Examiner — Andrea C Leggett
(74) Attorney, Agent, or Firm — Eric VanWiltenburg; Naval Surface Warfare Center, Crane Division

(57) ABSTRACT

The present invention relates to a scanning tool for text transmissions which identifies potentially sensitive text. In exemplary embodiments, a guardian application scans regular email (and calendar appointments) subject, message body, and attachments for key words that identify if a document is potentially sensitive and it notifies the user with specifics if key words are found. If the guardian application cannot scan (either an image or a document with text that cannot be scanned), it notifies the user, requests them to open and review the document, and requires the user to select if they have or have not reviewed the document. It will not send the email if the user selects that they have not reviewed the document.

4 Claims, 8 Drawing Sheets

SCANNING TOOL FOR DETECTING SENSITIVE INFORMATION IN TEXT TRANSMISSIONS

CROSS-REFERENCE TO RELATED APPLICATIONS

The present application claims priority to U.S. Provisional Patent Application Ser. No. 62/909,916, filed Oct. 3, 2019, entitled "Scanning Tool for Detecting Sensitive Information in Text Transmissions," the disclosure of which is expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention is assigned to the United States Government and is available for licensing for commercial purposes. Licensing and technical inquiries may be directed to the Technology Transfer Office, Naval Surface Warfare Center Crane, email: Cran_CTO@navy.mil.

FIELD OF THE INVENTION

The present invention relates to a software application that scans text transmissions.

BACKGROUND AND SUMMARY OF THE INVENTION

The present invention relates to a scanning tool for text transmissions which identifies potentially sensitive text and alerts the user. Email transmissions are an omnipresent part of modern business. It is common for users to improperly send sensitive information through email systems (e-spill) based on lack of attention. This results in significant lost time and money to recover from the e-spill. We have developed an email scanning tool that has been tested and customized for use in the NNPP.

According to an illustrative embodiment of the present disclosure, a guardian application scans regular email (and calendar appointments) subject, message body, and attachments for key words that identify if a document is potentially sensitive and it notifies the user with specifics if key words are found. If the guardian application cannot scan (either an image or a document with text that cannot be scanned), it notifies the user, requests them to open and review the document, and requires the user to select if they have or have not reviewed the document. It will not send the email if the user selects that they have not reviewed the document. If the program cannot scan a document, the user also has the option of sending the document to an alternate "file drop" location.

According to a further illustrative embodiment of the present disclosure,

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1A:
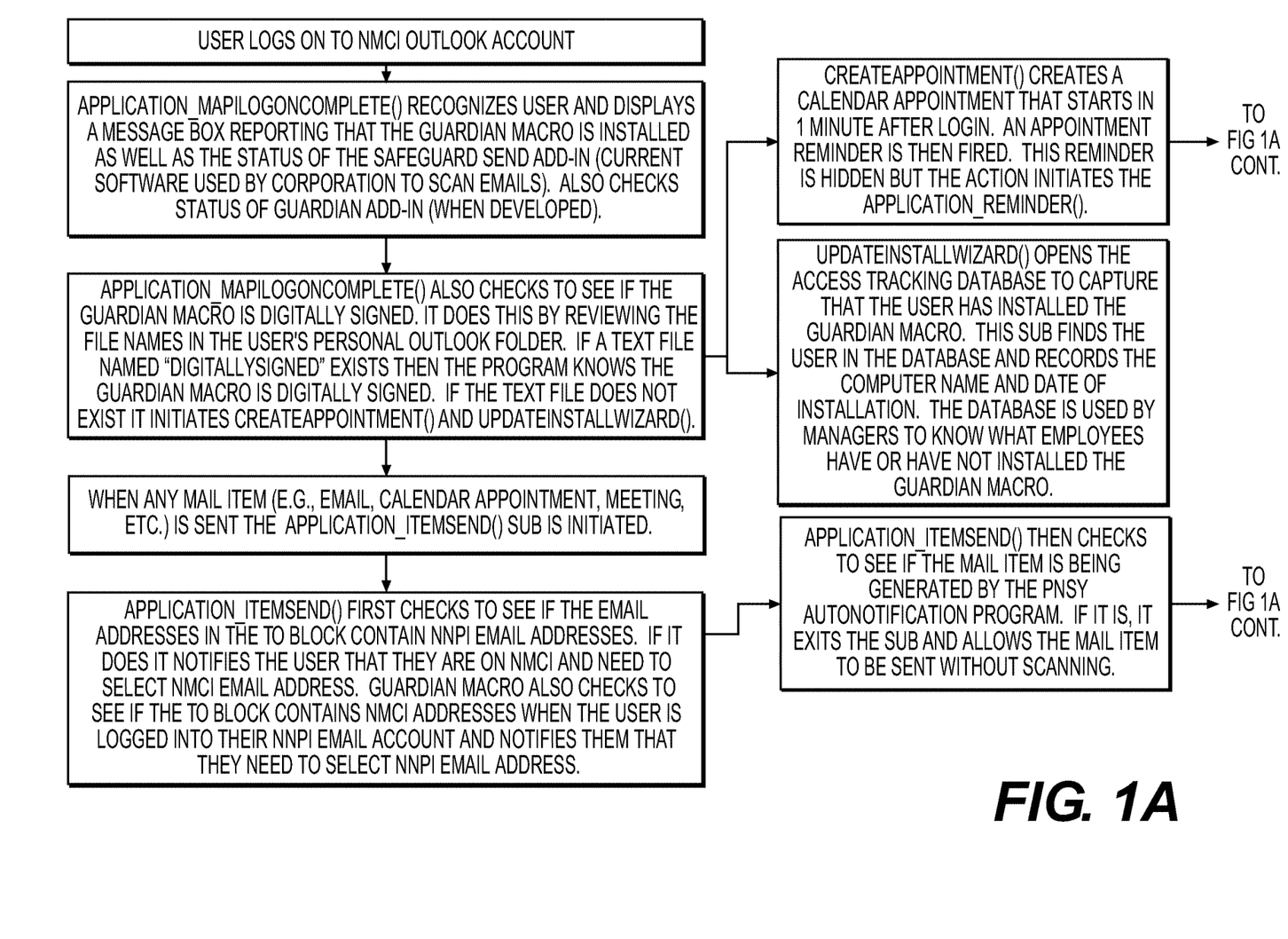
FIGS. 1A-C show a block diagram for an exemplary scanning tool process.
Figure 1B:
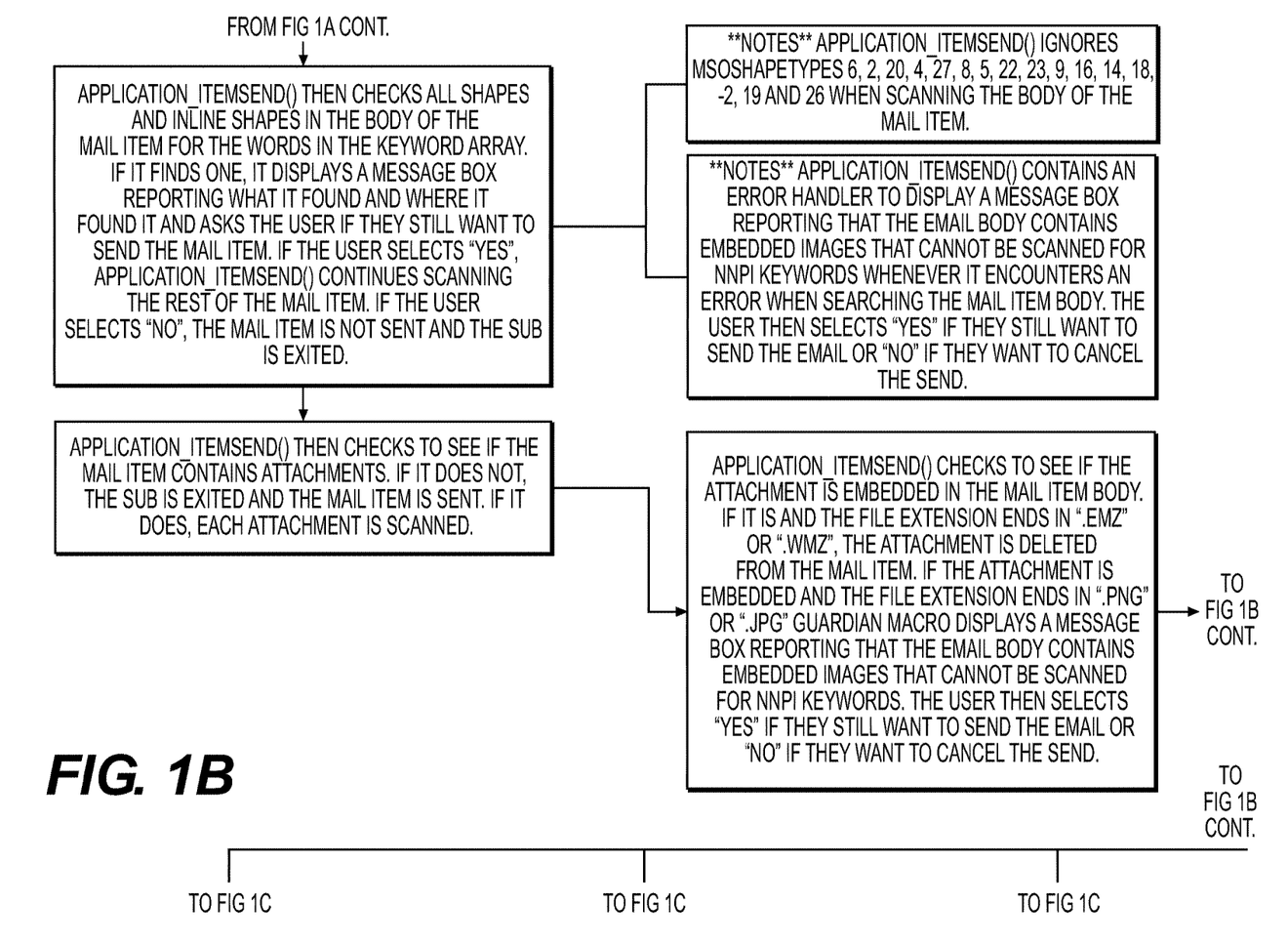
Figure 1C:
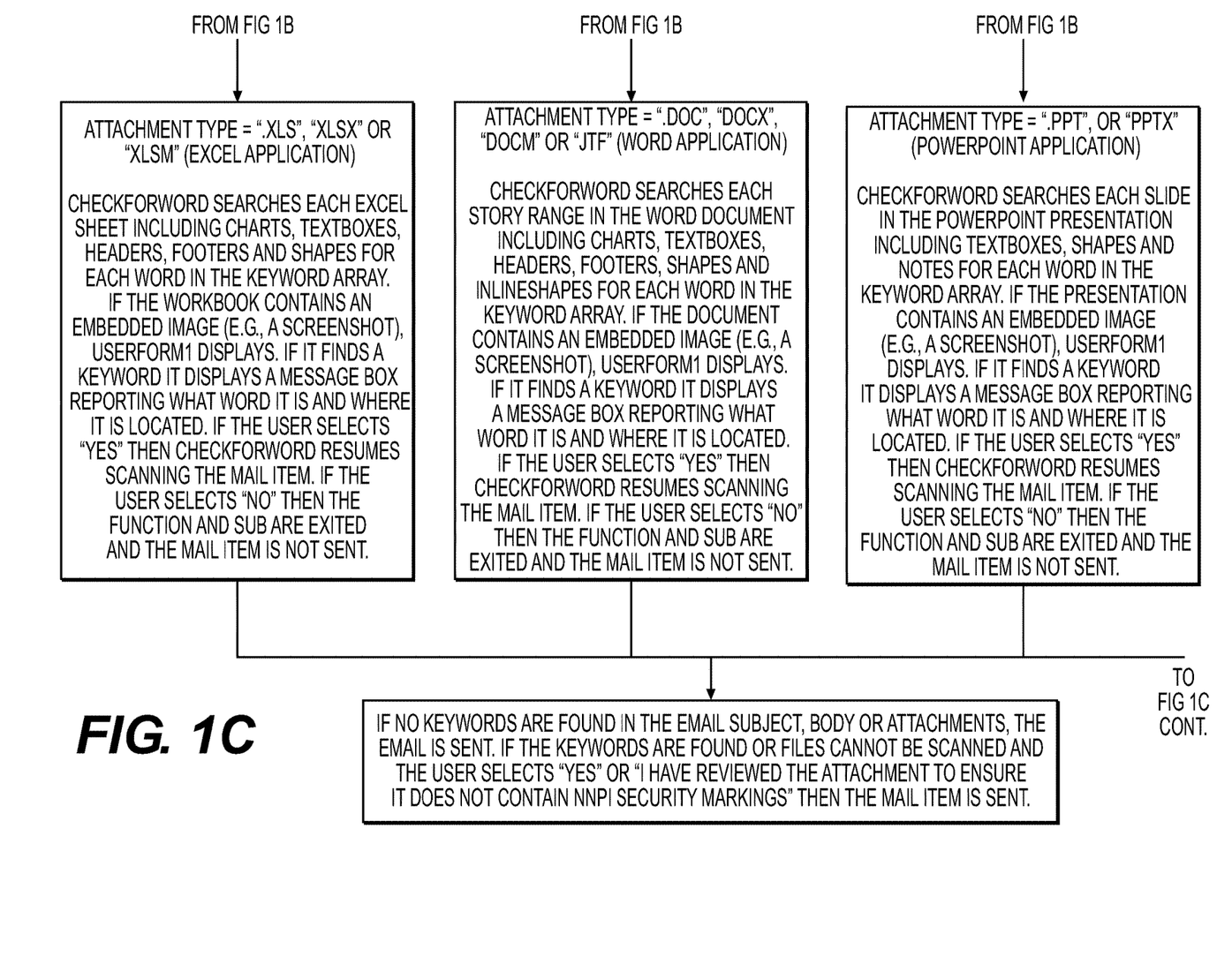

FIGS. 1A-C show a block diagram for an exemplary scanning tool process. In a first step, a user logs in to their email viewing application. Subroutine Application_MAPILogonComplete( ) recognizes user and displays a message box reporting that the Guardian Macro is installed as well as the status of any other installed security software. Application_MAPILogonComplete( ) also checks to see if the Guardian Macro is digitally signed. It does this by reviewing the file names in the user's personal Outlook folder. If a text file named "DigitallySigned" exists then the program knows the Guardian Macro is digitally signed. If the text file does not exist it initiates CreateAppointment( ) and UpdateInstallWizard( ). UpdateInstallWizard( ) opens the Access tracking database to capture that the user has installed the Guardian Macro. This sub finds the user in the database and records the computer name and date of installation. The database is used by managers to know what employees have or have not installed the Guardian Macro. CreateAppointment( ) creates a calendar appointment that starts in 1 minute after login. An appointment reminder is then fired. This reminder is hidden but the action initiates the Application_Reminder( ) Application_Reminder( ) displays UserForm2 which is a pop-up user form that asks the user if they would like to digitally sign the Guardian Macro. Clicking the green button "Yes, I Want To Digitally Sign" opens up the VBA Editor and uses SendKeys to automatically navigate to Tools→Digital Signature→Choose. From there the user must select "More Options" and select their personal digital certificate which was created when the Guardian Macro was first installed. Also when the user selects the green button, the text file named NotDigitallySigned" is changed to "DigitallySigned" so that the program knows in the future not to create the appointment and display UserForm2. Clicking the red button "No, I Will Do It Later" closes the form and does not open the VBA Editor or change the file name of the text file "NotDigitallySigned".

When any mail item (e.g., email, calendar appointment, meeting, etc.) is sent the Application_ItemSend( ) subroutine is initiated. Application_ItemSend( ) first checks to see if the email addresses in the To block include NNPI email addresses. If it does it notifies the user that they are on NMCI and need to select NMCI email address. Guardian Macro also checks to see if the To block contains NMCI addresses when the user is logged into their NNPI email account and notifies them that they need to select NNPI email address. Application_ItemSend( ) then checks to see if the mail item is being generated by the PNSY AutoNotification program. If it is, it exits the sub and allows the mail item to be sent without scanning. Application_ItemSend( ) then creates a keyword array that contains all of the keywords that it is looking for in the mail item and attachments. The keyword array can include any keywords related to sensitive topics.

Application_ItemSend( ) then scans the mail item's subject and body for all the words in the keyword array. If it finds one, it displays a message box reporting what it found and where it found it and asks the user if they still want to send the mail item. If the user selects "Yes", Application_ItemSend( ) continues scanning the rest of the mail item. If the user selects "No", the mail item is not sent and the subroutine is exited. When Application_ItemSend( ) is searching for the words in the keyword array, it checks to make sure that the keyword is not part of another word. For example, the keyword "SECRET" will not be flagged if the word "secretary" is contained in the mail item. Application_ItemSend( ) then checks all shapes and inline shapes in the body of the mail item for the words in the keyword array. If it finds one, it displays a message box reporting what it found and where it found it and asks the user if they still want to send the mail item. If the user selects "Yes", Application_ItemSend( ) continues scanning the rest of the mail item. If the user selects "No", the mail item is not sent and the subroutine is exited. Application_ItemSend( ) contains an error handler to display a message box reporting that the email body contains embedded images that cannot be scanned for keywords whenever it encounters an error when searching the mail item body. The user then selects "Yes" if they still want to send the email or "No" if they want to cancel the send. Application_ItemSend( ) then checks to see if the mail item contains attachments. If it does not, the sub is exited and the mail item is sent. If it does, each attachment is scanned. Application_ItemSend( ) checks to see if the attachment is embedded in the mail item body. If it is and the file extension ends in ".emz" or ".wmz", the attachment is deleted from the mail item. If the attachment is embedded and the file extension is an image file type, Guardian macro displays a message box reporting that the email body contains embedded images that cannot be scanned for keywords. The user then selects "Yes" if they still want to send the email or "No" if they want to cancel the send. If the attachment is not embedded and does not have a file extension of ".p7m" then the attachment is scanned through the CheckForWord function.

Function CheckForWord scans the subject attachment for each word in the keyword array. An error handler is established immediately. In the event an error is encountered, UserForm1 displays reporting to the user. UserForm1 displays a message reporting the results of the scan and contains two command buttons and a drop-down combo box. The first command button "Open File" allows the user to open a read only copy of the attachment being scanned. The second command button "Ports File Drop" opens Internet Explorer and automatically navigates to the Ports File Drop webpage. This webpage provides the user an alternative way to send the attachment securely and not over the unclassified network. Once the user has reviewed the file they must select an option from the combo box. If they select "I have reviewed the attachment to ensure it does not contain NNPI security markings." and select OK, function CheckForWord will continue scanning the rest of the mail item. If the user selects "I have NOT reviewed the attachment." and selects "OK" or "CANCEL", the function and sub are exited and the mail item is not sent. CheckForWord starts by scanning the filename of the subject attachment for keywords. If it finds one, it displays a message box reporting what word it found and where it found it. If the user selects "Yes", CheckForWord continues scanning the rest of the mail item. If the user selects "No", the function and sub are exited and the mail item is not sent. CheckForWord then saves a temporary local copy of the subject attachment so that it can be scanned internally.

If Attachment Type=".xls", "xlsx" or "xlsm" (Excel Application), CheckForWord searches each Excel sheet including charts, textboxes, headers, footers and shapes for each word in the keyword array. If the workbook contains an embedded image (e.g., a screenshot), UserForm1 displays. If it finds a keyword it displays a message box reporting what word it is and where it is located. If the user selects "Yes" then CheckForWord resumes scanning the mail item. If the user selects "No" then the function and sub are exited and the mail item is not sent.

If Attachment Type=".doc", "docx", "docm" or ".rtf" (Word Application), CheckForWord searchs each story range in the Word document including charts, textboxes, headers, footers, shapes and inlineshapes for each word in the keyword array. If the document contains an embedded image (e.g., a screenshot), UserForm1 displays. If it finds a keyword it displays a message box reporting what word it is and where it is located. If the user selects "Yes" then CheckForWord resumes scanning the mail item. If the user selects "No" then the function and sub are exited and the mail item is not sent.

If Attachment Type=".ppt" or "pptx" (PowerPoint Application), CheckForWord searchs each slide in the PowerPoint presentation including textboxes, shapes and notes for each word in the keyword array. If the presentation contains an embedded image (e.g., a screenshot), UserForm1 displays. If it finds a keyword it displays a message box reporting what word it is and where it is located. If the user selects "Yes" then CheckForWord resumes scanning the mail item. If the user selects "No" then the function and sub are exited and the mail item is not sent.

If Attachment Type=".pdf" (Adobe Reader/Pro Application), CheckForWord searches each page in the PDF for each word in the keyword array. If the PDF is not word searchable, does not contain words, or the user does not have Adobe Pro installed, UserForm1 displays. If it finds a keyword it displays a message box reporting what word it is and where it is located. If the user selects "Yes" then CheckForWord resumes scanning the mail item. If the user selects "No" then the function and sub are exited and the mail item is not sent.

If Attachment Type=".msg" (Outlook Application), CheckForWord searches the attached mail item's subject and body for each word in the keyword array. If it finds a keyword it displays a message box reporting what word it is and where it is located. If the user selects "Yes" then CheckForWord resumes scanning the mail item. If the user selects "No" then the function and sub are exited and the mail item is not sent.

If the attachment is not one of the file types listed then UserForm1 displays to report that the subject attachment cannot be scanned for keywords.

If no keywords are found in the email subject, body or attachments, the email is sent. If keywords are found or files cannot be scanned and the user selects "Yes" or "I have reviewed the attachment to ensure it does not contain NNPI security markings." then the mail item is sent. If keywords are found or files cannot be scanned and the user selects "No" or "I have NOT reviewed the attachment." or "Cancel" then the mail item is not sent and control returns to the user.

Figure 2:
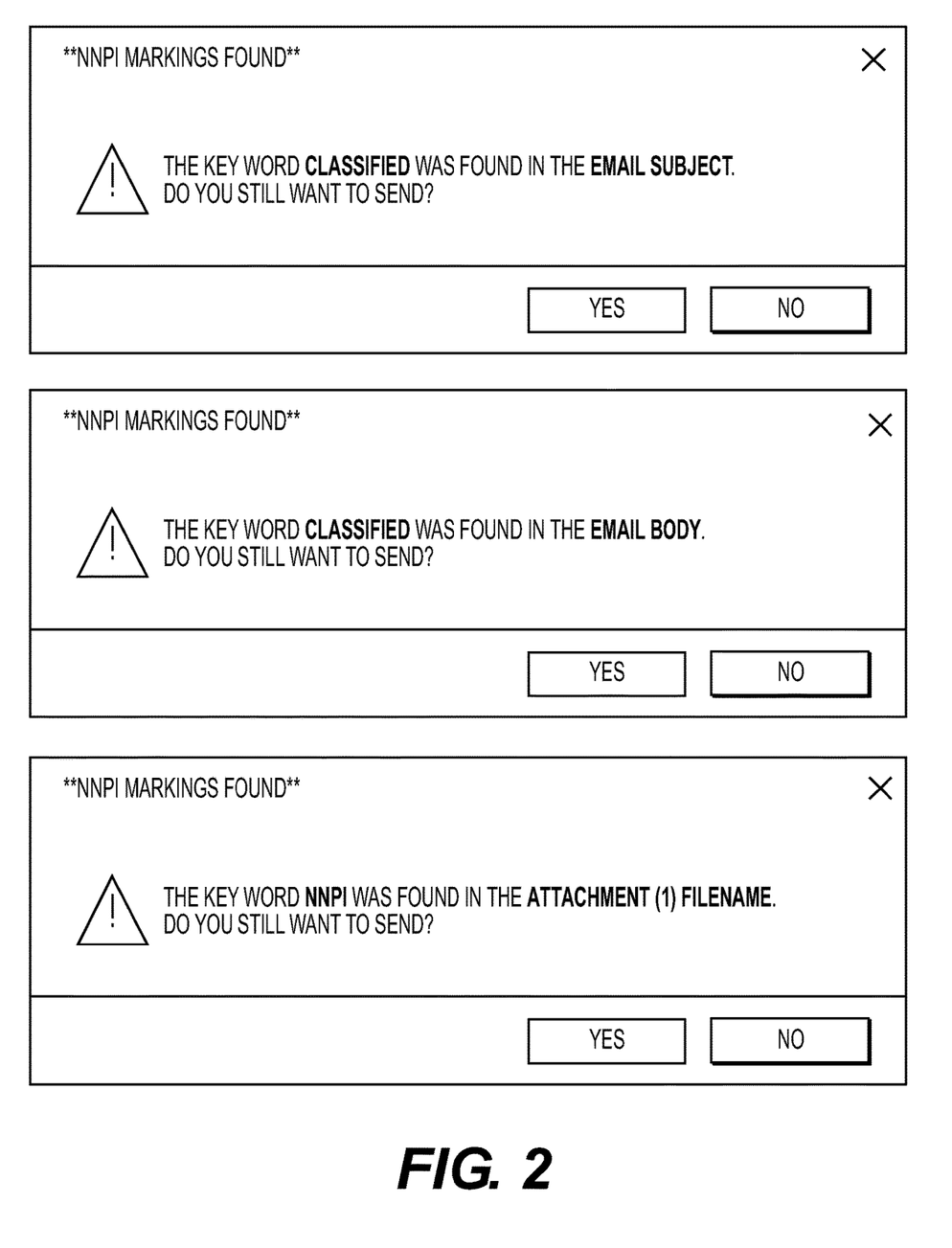
FIG. 2 shows exemplary graphical user interface (GUI) elements depicting results of a scan.

FIG. 2 shows exemplary graphical user interface (GUI) elements depicting results of a scan. The first two GUI elements are examples of Application_ItemSend( ) outputs. The third GUI element is an example of a CheckForWord output.

Figure 3:
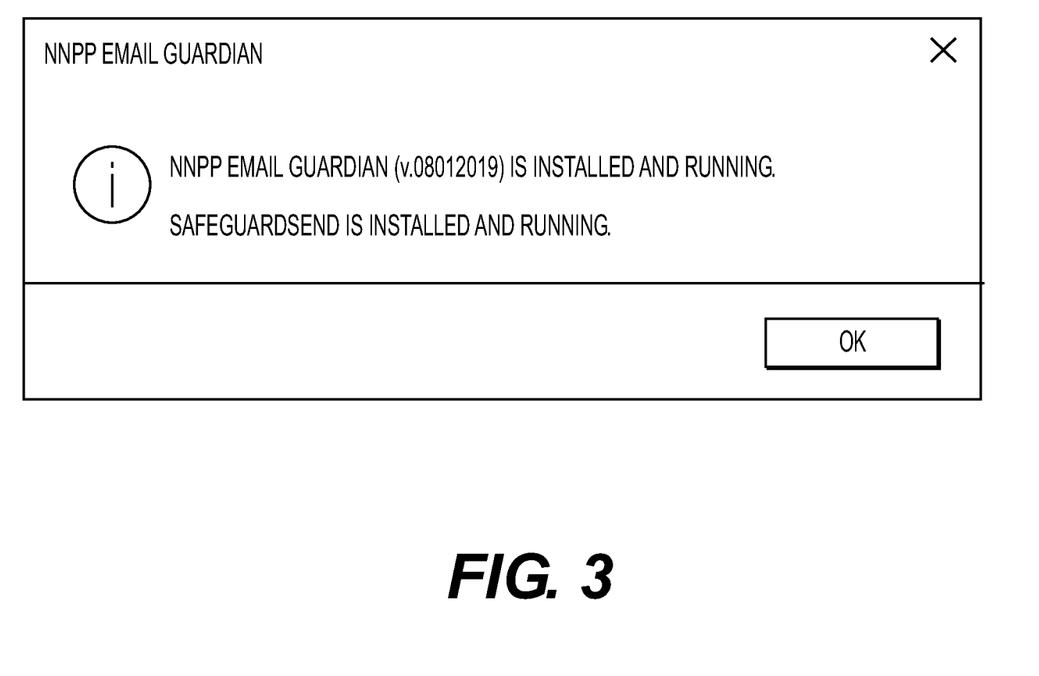
FIG. 3 shows an exemplary GUI element depicting a program status message.

FIG. 3 shows an exemplary GUI element depicting a program status message. The GUI element is an example of a Application MAPILogonComplete( ) output.

Although the invention has been described in detail with reference to certain preferred embodiments, variations and modifications exist within the spirit and scope of the invention as described and defined in the following claims.

The invention claimed is:

1. An email scanning tool comprising:
   a keyword database comprising at least one keyword;
   a first plurality of machine instructions comprising initialization instructions that identify an application operator, display a first graphical user interface (GUI) comprising a status identifier, and check for a digital signature file;
   a second plurality of machine instructions that generates a second GUI comprising a digital signature reminder configured to enable a user to provide a digital signature, wherein the second plurality of machine instructions are configured to execute when the first plurality of machine instructions does not detect the digital signature file;
   a third plurality of machine instructions comprising tracking database update instructions that records installation or non-installation of the scanning tool to an external database; and
   a fourth plurality of machine instructions comprising an email subject line scan function, an email body scan function, and an email attachment scan function, wherein the fourth plurality of machine instructions execute when the user sends an email, wherein the email subject line scan function searches for the at least one keyword within an email subject line, wherein the email body scan function searches for the at least one keyword within an email body, wherein the email attachment scan function searches for the at least one keyword within an email attachment and the filename of the email attachment, and wherein when at least one of the subject line, email body, or email attachment scan functions find the at least one keyword, the fourth plurality of machine instructions display a message including the at least one keyword and a location of where the at least one keyword was found by the subject line, email body, or email attachment scan functions, and a query whether the user wants to resume sending the email;
   wherein the fourth plurality of machine instructions are configured to execute an error handler if a file type of the email attachment cannot be scanned for text or if the email attachment comprises embedded images, wherein the error handler is configured to display a warning message and a first command button that opens a read only copy of the attachment being scanned and a second command button that opens a web browser and automatically navigates to a file drop webpage that provides an alternative way to send the attachment securely and not over an unclassified network.

2. The scanning tool of claim 1, wherein the fourth plurality of machine instructions further comprising:
   a third GUI comprising an email subject line keyword notification;
   a fourth GUI comprising an email body keyword notification; and
   a fifth GUI comprising an email attachment keyword notification.

3. The scanning tool of claim 2, wherein the fifth GUI is configured to display a warning message when a file type of the email attachment cannot be scanned for text or the email attachment comprises embedded images.

4. The scanning tool of claim 1, wherein the machine instructions comprise initialization instructions that open an access tracking database to capture that the user has installed the email scanning tool, finds the user in the database and records the computer name and date of installation.

\* \* \* \* \*